May 31, 1932.　　　F. L. DALY　　　1,861,302
AUTO SANDER
Filed Aug. 28, 1931
Fig. 1.
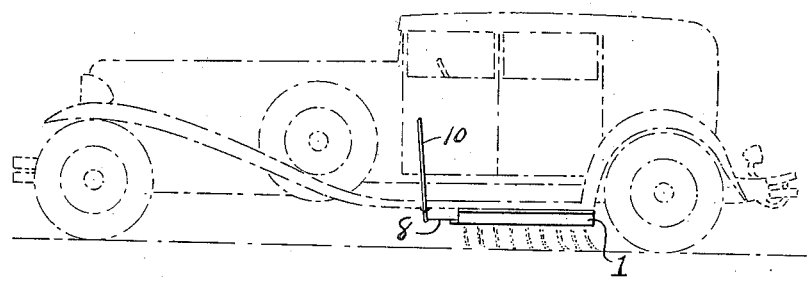
Fig. 3.
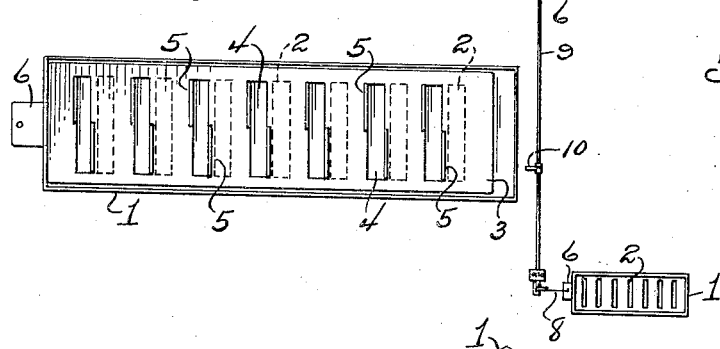
Fig. 2.
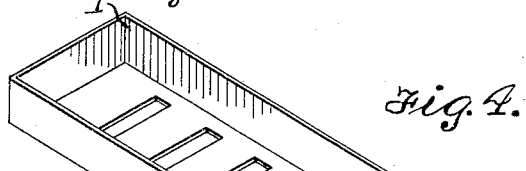
Fig. 4.
Fig. 5.
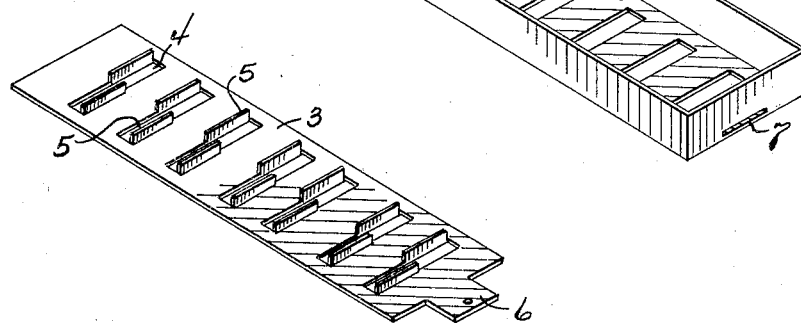
Francis L. Daly
INVENTOR
BY Victor J. Evans
and Co. ATTORNEY Patented May 31, 1932

1,861,302

UNITED STATES PATENT OFFICE

FRANCIS L. DALY, OF NAUGATUCK, CONNECTICUT

AUTO SANDER

Application filed August 28, 1931. Serial No. 560,015.

My present invention has reference to an anti-skidding device for automobiles or like vehicles, and my object is to arrange beneath and secure to the running boards of an automobile or like vehicle a box containing sand and provided with openings that are controlled by a slidable valve which is operated from the driver's seat of the vehicle and whereby, in slippery weather conditions, the valve may be moved to open or partly open the apertures in the box so that sand will be delivered onto the roadway directly in front of the drive wheels of an automobile.

A further object is the provision of a road sanding device for vehicles in which the sand contained in the sand box is agitated to break up any lumps that may occur therein by the valve which controls the outlet slots or apertures in the bottom of the sanding box.

A still further object is the provision of a sanding device for the traction wheels of vehicles which is of a length approximately equaling that of the running boards of the machine, so that the same will rather add to than detract from the appearance of the machine.

To the attainment of the foregoing the invention consists in the improvement hereinafter described and definitely claimed.

In the drawings:

Figure 1 is a side elevation of the improvement in applied position.

Figure 2 is a plan view of the improvement.

Figure 3 is an enlarged plan view of one of the sand boxes with the valve therein.

Figure 4 is a perspective view of one of the said boxes.

Figure 5 is a similar view of one of the valve plates.

In carrying out my invention I secure upon the inner face of the running boards of an automobile boxes 1 which have their bottoms provided with transverse spaced slots or apertures 2. The running boards are provided with suitable openings whereby sand may be directed into the boxes. The boxes are of a length equaling that of the running board and are flush with the outer edges thereof and consequently are arranged directly forward of the traction wheels of the vehicle. Resting on the bottom of each of the boxes 1 there is a valve plate 3 which is of a width corresponding to that of the boxes so that the edges thereof will contact with the inner faces of the sides of the box. Each valve plate 3 is provided with transverse slots or apertures 4 corresponding in number with the slots or apertures 2 in the bottom of the box 1 but the opposed longitudinal walls provided by the slots or apertures 4 are formed with upstanding agitating plates 5. Each plate is of a length approximately equaling one-half of the length of the slots or apertures 4.

One end of each of the valve plates 3 is provided with a tongue extension 6 that passes through a slot 7 in one end and adjacent to the bottom of each box 1. To the upper ends of the tongues there are connected links 8 which are in turn connected to the offset ends of the rod 9 that is arranged transversely below the body of the machine in which the device is arranged and this rod or shaft has connected therewith an upstanding lever 10 that is received through a suitable slot in the floor board of the automobile forward of the driver's seat.

The valve plates are of a less length than the sand boxes 1 so that the valves are moved by the operation of the lever fully into the boxes. The apertures 4 will be brought out of a line with the apertures 2 in the bottom of the boxes, thereby closing the said apertures 2. When the lever is thrown to another position the valve plates will move in the box so that the ends thereof provided with the tongue 6 will contact with one of the ends of the boxes. This brings the apertures 4 in a line with the apertures 2 in the bottom of the box so that sand will be directed through the alining apertures. The apertures 4 may be brought to fully or only partly uncover the apertures 2 so that a determined quantity of sand will be delivered onto the roadbed. The upstanding plates 5 are in the nature of agitators and in the movement of the valve plate to thoroughly stir and mix the sand to prevent any lumping thereof.

It is believed that the construction and advantages of my improved device will be understood and appreciated by those skilled in the art to which such invention relates so that further detailed description will not be required.

Having described the invention, I claim:

Boxes having apertured bottoms designed to be secured under the running boards of an automobile or like vehicle, an apertured valve plate in each box of a length less than that of the box, each valve plate having a tongue which is received through one end of the box adjacent the bottom thereof, links connected to the tongues, a transversely arranged shaft journaled beneath the body of the vehicle and having a lever which extends into the body of the vehicle and each of the valve plates, in a line and at the opposite sides of the apertures therein, having upstanding sand agitator flanges.

In testimony whereof I affix my signature.

FRANCIS L. DALY.